US008139498B2

(12) United States Patent
Seo et al.

(10) Patent No.: US 8,139,498 B2
(45) Date of Patent: Mar. 20, 2012

(54) METHOD AND APPARATUS FOR DETERMINING REPORTING PERIOD OF CHANNEL QUALITY INFORMATION IN MULTI-CARRIER WIRELESS SYSTEM

(75) Inventors: Bangwon Seo, Daejon (KR); Heesoo Lee, Daejon (KR); Hyun-Kyu Chung, Daejon (KR); Dongwoo Kim, Ansan-si (KR); In-Ho Lee, Yangju-si (KR)

(73) Assignee: Electronics and Telecommunications Research Institute, Daejon (KR)

( * ) Notice: Subject to any disclaimer, the term of this patent is extended or adjusted under 35 U.S.C. 154(b) by 125 days.

(21) Appl. No.: 12/513,249

(22) PCT Filed: Oct. 31, 2007

(86) PCT No.: PCT/KR2007/005448
§ 371 (c)(1),
(2), (4) Date: Nov. 12, 2009

(87) PCT Pub. No.: WO2008/054143
PCT Pub. Date: May 8, 2008

(65) Prior Publication Data
US 2010/0061258 A1   Mar. 11, 2010

(30) Foreign Application Priority Data

Nov. 3, 2006 (KR) .......................... 10-2006-0108522
Oct. 30, 2007 (KR) .......................... 10-2007-0109512

(51) Int. Cl.
*G01R 31/08* (2006.01)
(52) U.S. Cl. .......................... 370/252; 370/241; 370/329

(58) Field of Classification Search .................. 370/241, 370/252–253, 329–338, 468–473; 375/260–267, 375/299, 347–351
See application file for complete search history.

(56) References Cited

U.S. PATENT DOCUMENTS
2004/0022213 A1  2/2004 Choi et al.
(Continued)

FOREIGN PATENT DOCUMENTS
KR   1020030038378   5/2003
(Continued)

OTHER PUBLICATIONS

Kim, Dongwoo et al., "On Capacity of Quality-Based Channel-State Reporting in Mobile Systems With Greedy Transmission Scheduling," *IEEE Transactions on Communications*, vol. 54(6):975-979 (2006).

(Continued)

*Primary Examiner* — Pao Sinkantarakorn
*Assistant Examiner* — Iqbal Zaidi
(74) *Attorney, Agent, or Firm* — Nelson Mullins Riley & Scarborough LLP; EuiHoon Lee, Esq.

(57) ABSTRACT

Provided are a method and an apparatus for determining a reporting period of channel quality indicator. The method includes the steps of: a) estimating a channel gain through a channel received from a base station; b) calculating a weight by using a variable for determining a fairness value and the estimated channel gain, and estimating weight channel quality to the estimated channel gain by using the calculated weight; c) comparing the estimated weight channel quality and a threshold value; and d) feeding back estimated channel quality indicator by using wireless resources assigned for the channel quality indicator feedback only in case that the weight channel quality is higher than the threshold value.

17 Claims, 7 Drawing Sheets

U.S. PATENT DOCUMENTS

| | | |
|---|---|---|
| 2004/0110510 A1 | 6/2004 | Jeon et al. |
| 2004/0264588 A1* | 12/2004 | Song et al. ............... 375/260 |
| 2005/0281226 A1 | 12/2005 | Lee et al. |
| 2007/0183533 A1* | 8/2007 | Schmidl et al. .......... 375/299 |

FOREIGN PATENT DOCUMENTS

| | | |
|---|---|---|
| KR | 1020030092894 | 12/2003 |
| KR | 1020050046305 | 5/2005 |
| KR | 1020050050922 | 6/2005 |
| KR | 1020050087374 | 8/2005 |
| KR | 1020060023999 | 3/2006 |
| KR | 10-0625143 | 9/2006 |
| WO | WO-2006/036053 A2 | 4/2006 |

OTHER PUBLICATIONS

Lee, Heesoo et al., "On Capacity of Modified Quality-Based Channel-State Reporting with Fairness in Mobile Systems," WWRF17-WG4-19 (2006).

\* cited by examiner

METHOD AND APPARATUS FOR DETERMINING REPORTING PERIOD OF CHANNEL QUALITY INFORMATION IN MULTI-CARRIER WIRELESS SYSTEM

Related Applications

This application is a 35 U.S.C. §371 national stage filing of International Application No. PCT/KR2007/005448 filed on Oct. 31, 2007, which claims priority to, and the benefit of, Korean Patent Application No. 10-2006-0108522 filed on Nov. 3, 2006 and Korean Patent Application No. 10-2007-0109512 filed on Oct. 30, 2007. The contents of the aforementioned applications are hereby incorporated by reference.

TECHNICAL FIELD

The present invention relates to a method and an apparatus for determining a reporting period for providing channel quality indicator; and, more particularly, to a method and an apparatus for determining a reporting period, i.e., a feedback period, for providing channel quality indicator in order to feed back the channel quality indicator such as a channel quality indicator (CQI) in a multi-carrier wireless system such as an Orthogonal Frequency Division Multiple Access (OFDMA) communication system.

This work was supported by the IT R&D program of MIC/IITA [2006-S-001-01, "Development of Adaptive Radio Access and Transmission Technologies for 4th Generation Mobile Communications"].

BACKGROUND ART

Even though the wireless communications were initially developed to provide voice services, technologies for providing data services have been developing according to rapid technological improvements. Furthermore, as the demands for data transmissions and the number of mobile stations are increasing, technologies have been developing for more efficiently transmitting data. Such a wireless communication system allows every mobile station to more exactly grasp channel conditions between a base station and the mobile station and then transmit data.

The Wideband Code Division Multiple Access (WCDMA) communication system transmits data of all users by spreading it over the entire bands, so that there is only a channel quality value and data transmissions, the mobile station initially acquires control information such as the number of times of retransmission responses, a feedback period of the channel quality value, the number of times of repetition transmissions of the channel quality value, power offset, and the like, through signaling with a base station. A mobile station to carry out communications continues to monitor an entire High Speed Shared Control Channel (HS-SCCH), periodically transmitting a channel quality value through a High Speed Dedicated Control Channel (HS-DPCCH). Further, if the mobile station finds out control information necessary for data reception, the mobile station receives data based on the control information through a forward High Speed Packet Data Shared Channel (HS-PDSCH).

In the meantime, discussions on the Long Term Evolution (LTE) are in progress in the 3$^{rd}$ Generation Partnership Project (3GPP) which is responsible for standardization. The LTE is a technology for implementing high-speed packet-based communications of about 100 Mbps for the purpose of commercialization by year 2010. The Orthogonal Frequency Division Multiplexing Accessing (OFDMA) technology is currently considered for the LTE.

The OFDMA technology, as a data transmission technology using multi-carrier, refers to a technology for converting symbol sequences inputted in series into symbols in parallel and modulating and transmitting the symbols by using a plurality of orthogonal sub-carriers.

The OFDMA system requires channel quality indicator (CQI) fed back by a mobile station in order to more adaptively allocate and employ wireless resources according to wireless environments of mobile stations under consideration of wireless resources efficiency. Such channel quality indicator feedback is implemented through a control channel shared by several mobile stations.

For example, a mobile station in the OFDMA system measures selected parameters of a received signal. Furthermore, the parameters measured at the mobile station and estimation values obtained from selectively measured parameters are fed back to a base station through a standard message referred as a channel quality indicator (CQI). Next, the base station uses CQI information to optimize signals transmitted from a forward channel, so enhancing signal receptions at the mobile station.

In general, since a characteristic of a wireless channel varies with time, the variation of channel quality has to be fed back to a base station in order to maintain optimal performance when the channel quality variation occurs. However, the feedback of channel quality indicator should be carried out under consideration of other users and loads caused by using uplink resources for performing the feedback operation.

To do so, in the conventional approach, each mobile station compares a channel gain of received signals to a predetermined threshold value, and feeds back channel quality indicator through a feedback channel to a base station only when the channel gain is higher than the predetermined threshold value. The predetermined threshold value is applied to all mobile stations in the same manner.

Under real wireless environments, a mobile station typically has a reception power level different from that of another due to a distance between a mobile station and a base station, and geographical communication environments in which a mobile station is placed. However, when the same threshold value is assigned to all users and the feedback of channel state information is made according to a result of comparison of an estimated channel gain and one threshold value, there is a problem that a mobile station of highest reception power level, e.g., a mobile station closes to a base station, can easily feed back channel quality indicator while a mobile station of low reception power level, e.g., a mobile station located far away from a base station, can hardly feed back the channel quality indicator. As a result, according to the conventional approach, there occurs a problem of fairness on user capacity within the same cell, which can become more severe as a reception power level difference of users becomes bigger.

TECHNICAL PROBLEM

It is a first object of the present invention is provide a method and an apparatus for determining a feedback period of channel quality indicator in a multi-carrier wireless system, which is capable of allowing a mobile station to employ a weighted channel quality considering an average channel gain rather than a channel gain of the mobile station and to determine whether the channel quality indicator is fed back or not by using a different threshold value for each mobile station.

It is a second object of the present invention to provide a method and an apparatus for determining a feedback period of channel quality indicator in a multi-carrier wireless system, which is capable of enhancing a feedback success probability for a mobile station having a good channel state by assigning a different feedback period for channel quality indicator to each mobile station according to an estimated channel state.

It is a third object of the present invention to provide a method and apparatus for determining a feedback period of channel quality indicator in a multi-carrier wireless system, which is capable of assigning a different feedback period of channel quality indicator is assigned according to a moving velocity of a mobile station.

It is a fourth object of the present invention to provide a method and an apparatus for determining a feedback period of channel quality indicator in a multi-carrier wireless system, which is capable of assigning a different feedback period of channel quality indicator according to a channel state and moving velocity of a mobile station.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

TECHNICAL SOLUTION

In accordance with an aspect of the present invention, there is provided a method for determining a feedback period for feedback of channel quality indicator in a mobile station for a wireless communication system, including the steps of: a) estimating a channel gain through a channel received from a base station; b) calculating a weight by using a variable for determining a fairness value and the estimated channel gain, and estimating weight channel quality to the estimated channel gain by using the calculated weight; c) comparing the estimated weight channel quality and a threshold value; and d) feeding back estimated channel quality indicator by using wireless resources assigned for the channel quality indicator feedback only in case that the weight channel quality is higher than the threshold value.

In accordance with another aspect of the present invention, there is provided an apparatus for determining a feedback period of channel quality indicator in a mobile station for a wireless communication system, including: a memory for storing a variable for determining a fairness value and a threshold value; a channel gain estimation unit for estimating a channel gain from a signal transmitted from a base station; a weight channel quality estimation unit for calculating a weight by using the stored fairness value determination variable and the estimated channel gain, and estimating weight channel quality to the estimated channel gain in use of the calculated weight; and a comparison unit for comparing the estimated weight channel quality to the stored threshold value and determining feedback of estimated channel quality indicator only in case that the weight channel quality is higher than the threshold value.

In accordance with still another aspect of the present invention, there is provided a method for determining a feedback period for feedback of channel quality indicator in a mobile station for a wireless communication system, including the steps of: a) estimating a channel gain through a channel received from a base station; b) checking from a table the feedback period of channel quality indicator according to the estimated channel gain; and c) feeding back estimated channel quality indicator by using wireless resources assigned for the feedback of channel quality indicator according to the checked feedback period of channel quality indicator, wherein the better a channel state checked from the estimated channel gain, the shorter the feedback period of channel quality indicator is set.

In accordance with still another aspect of the present invention, there is provided a method for determining a feedback period of channel quality indicator in a mobile station for a wireless communication system, including steps of: a) estimating a channel gain through a channel received from a base station; b) measuring a moving velocity of a mobile station; c) checking the feedback period of channel quality indicator according to a combination of the estimated channel gain and the moving velocity of the mobile station; and d) feeding back estimated channel quality indicator by using wireless resources assigned for the feedback of channel quality indicator according to the checked feedback period of channel quality indicator.

ADVANTAGEOUS EFFECTS

The present invention mentioned above, in a channel quality indicator feedback technology needed for efficient wireless resources allocation in the OFDMA communication system for packet transmission, can acquire uniform feedback frequency of channel quality indicator for the mobile station by determining whether or not the channel quality indicator is fed back by using a weighted channel quality considering an average channel gain of a mobile station. Furthermore, the present invention can assign priority to each mobile station by comparison with a weighted channel quality by using a different threshold value for each mobile station.

Still further, the present invention has an effect of controlling a feedback amount by assigning a different feedback period for providing channel quality indicator according to a channel state and moving velocity of a mobile station, and of feeding back the channel quality indicator effectively according to channel changes.

BEST MODE FOR THE INVENTION

The advantages, features and aspects of the invention will become apparent from the following description of the embodiments with reference to the accompanying drawings, which is set forth hereinafter. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Figure 1:
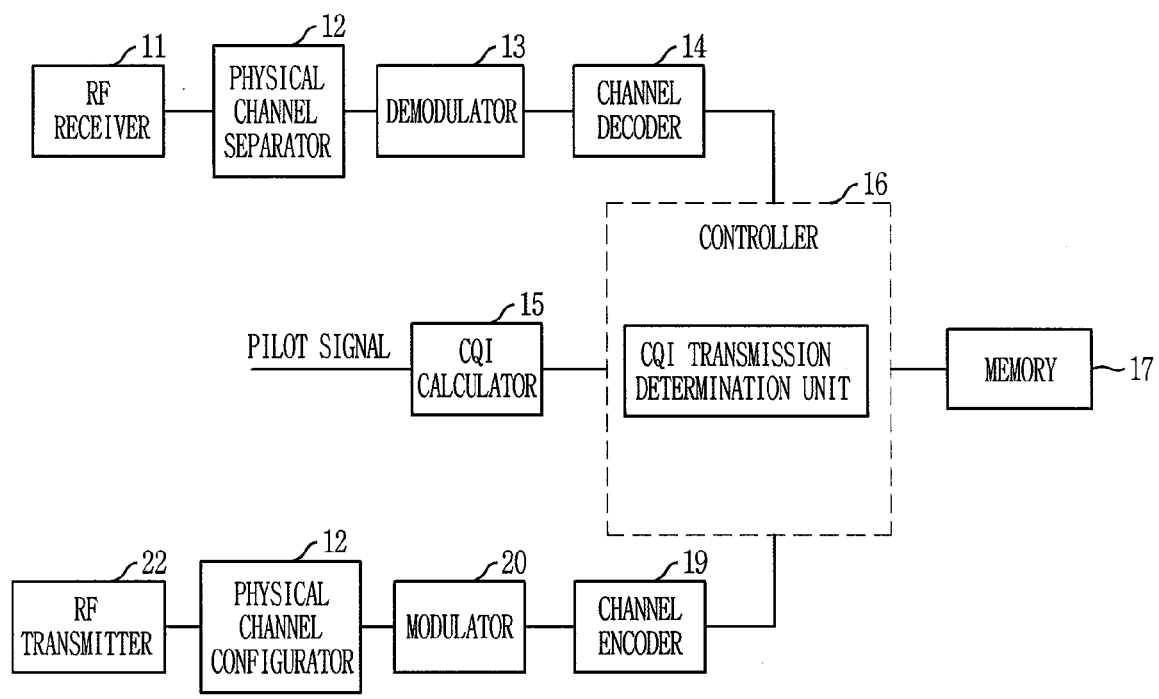
FIG. 1 is a functional block diagram of a mobile station in accordance with an embodiment of the present invention.

FIG. 1 is a functional block diagram of a mobile station in accordance with an embodiment of the present invention. A mobile station in accordance with an embodiment of the present invention is the orthogonal frequency division multiple access (OFDMA)-based mobile station which operates as a transmitter for transmitting channel quality indicator.

Referring to FIG. 1, an RF signal receiver 11 converts Radio Frequency (RF) signals received from a base station into a baseband signal, and provides the baseband signal to a physical channel separator 12. The physical channel separator 12 generally includes a cyclic prefix (CP) remover, a serial/parallel converter, a Fast Fourier Transformer (FFT), and a parallel/serial converter. The cyclic prefix (CP) remover removes a cyclic prefix (CP) symbol inserted for a guard interval from received OFDM symbols, and generates serial baseband signals in a time domain. The serial/parallel converter converts baseband signals of time domain into parallel signals of time domain. An N-sized FFT performs an FFT algorithm, to thereby generate N parallel frequency-domain signals. The parallel/serial converter converts the parallel frequency-domain signals into a QAM data symbol sequence.

The demodulator 13 demodulates the QAM symbols and restores an original input data stream. Furthermore, a channel decoder 14 performs channel decoding of data inputted from the demodulator 13 to provide the decoded data to a controller 16.

A channel quality indicator (CQI) calculator 15 generates CQI values by using an OFDM-based common pilot channel signal received from a base station. At the same time, the channel quality indicator (CQI) calculator 15 receives various parameters, and uses a CQI table obtained in advance.

A channel encoder 19 is a functional block implementing channel encoding, and it receives a predetermined information bit stream from the controller 16 and performs the channel encoding. In general, the channel encoder 19 may be a convolutional encoder, a turbo encoder, or a low density parity check (LDPC) encoder.

The modulator 20 performs the modulation of the Quadrature Phase shift Keying (QPSK), 8PSK, 16-ary Quadrature Amplitude Modulation (16QAM), 64QAM, 256QAM, and the like.

A physical channel configurator 21 includes a serial/parallel converter, an Inverse Fast Fourier Transformer (IFFT), and a cyclic prefix (CP) inserter. The serial/parallel converter inputs and converts the outputs of a demodulator 20 into parallel data. The N-sized IFFT receives the output data of the serial/parallel converter and implements an IFFT algorithm. The output data of the IFFT are converted into serial data in the parallel/serial converter. The CP inserter inserts a CP symbol into the output data of the parallel/serial converter.

The controller 16 includes a CQI transmission determination unit for determining whether or not the channel quality indicator is fed back in accordance with an embodiment of the present invention. The operations of the CQI transmission determination unit will be described later in detail. Furthermore, the controller 16 includes a resource manager which manages wireless resources for transmitting channel quality indicator. A memory 17 stores various information needed for the CQI transmission determination unit of the controller 16 to determine whether or not channel quality indicator is transmitted, and performs a function of transferring the information under the control of the controller 16.

With the mobile station stated above, an apparatus for determining a feedback period of channel quality indicator in accordance with an embodiment of the present invention includes a memory for storing variables, weight values and threshold values for determining a fairness value, a channel gain estimator for estimating a channel gain from signals transmitted from a base station, a weighted channel quality estimator for estimating weight channel quality as to the estimated channel gain based on the stored weight values and variables for determining a fairness value, and a comparator for comparing the estimated weight channel quality and the stored threshold values and then determining the feedback of measured channel quality indicator only if the weight channel quality is higher than the threshold value.

Figure 2:
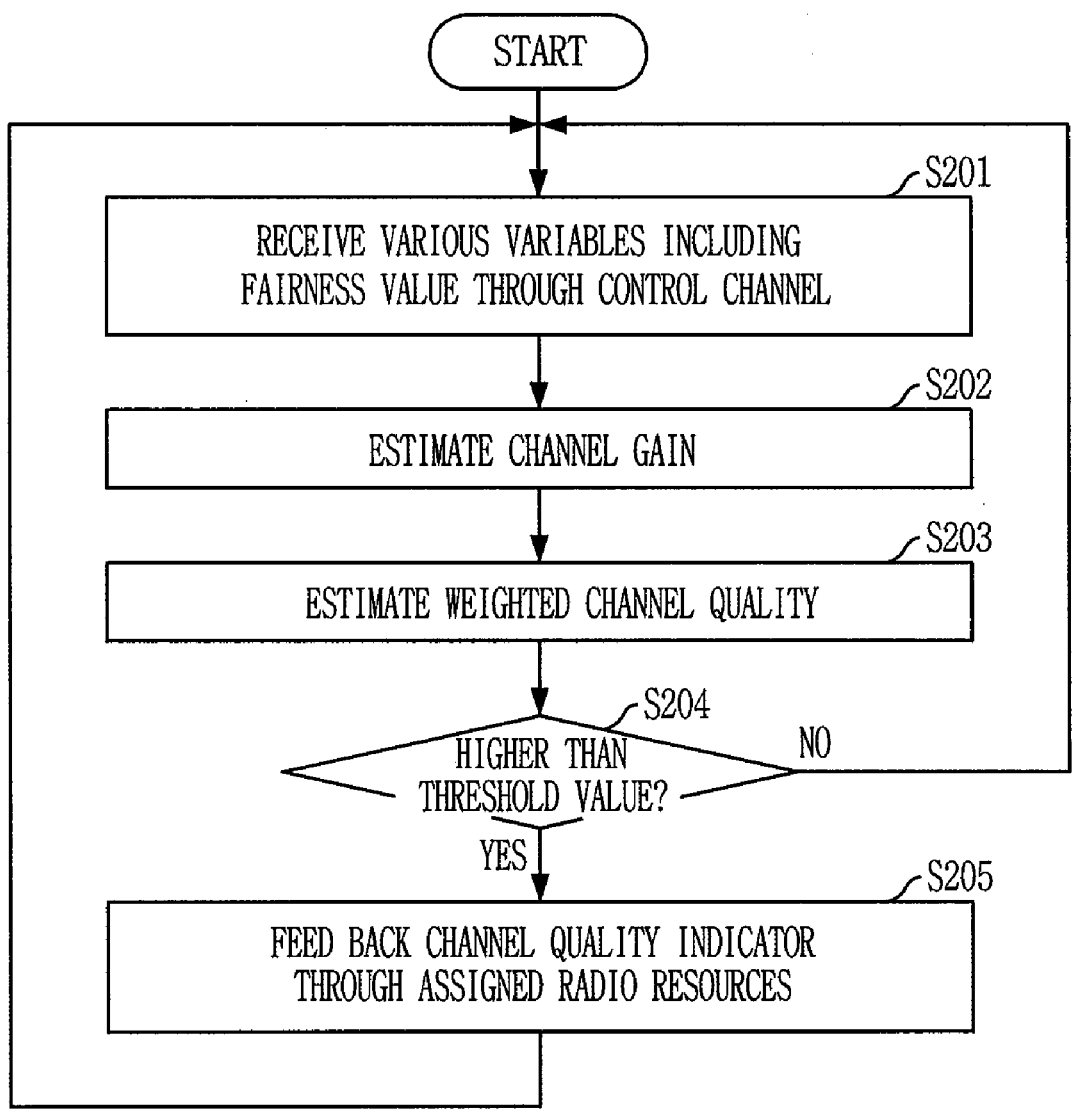
FIG. 2 is a flowchart of determining a feedback period of channel quality indicator for the mobile station in accordance with an embodiment of the present invention.

FIG. 2 is a flowchart describing a method for determining a feedback period for feedbacks of channel quality indicator for a mobile station in accordance with an embodiment of the present invention.

One base station and K mobile stations are taken for an example for description purpose hereinafter. Each mobile station is assumed to estimate channel quality by using a pilot signal received from the base station.

Hereinafter, description is made for the first embodiment in which the controller of a mobile station determines whether or not channel quality indicator is transmitted by using weighted channel quality in order to feed back the channel quality indicator. Equation 1 as below is for defining a weight $W_k$ used for an arbitrary $K^{th}$ user.

$$W_k = \left[\frac{1}{E[|h_k|^2]}\right]^f, \quad \text{Eq. 1}$$

Where $|h_k|^2$ denotes a channel gain of the $K^{th}$ user, f a factor determining a fairness value, and $E[.]$ statistical expectation value operation. That is, a weight is estimated by obtaining a value through dividing 1 by a statistical expectation value as to a channel gain, and then raising the obtained value to the power of a factor determining fairness information.

Furthermore, the weight channel quality for each mobile station is obtained by multiplying a weight value by a channel gain ($W_k * |h_k|^2$), and the mobile station implements feedback of channel quality indicator only if the weight channel quality satisfies the conditions described as Equation 2.

$$w_k \cdot |h_k|^2 \geq R_k \quad \text{Eq. 2}$$

In Equation 2, $R_k$ denotes a threshold value for the $K^{th}$ mobile station, and the threshold value can be adjusted under consideration of priority of a mobile station. That is, the higher priority a mobile station has, the lower a threshold value for the mobile station, and the lower priority a mobile station has, the higher a threshold value for the mobile station.

When $R_1=R_2=L=R_k$ in Equation 1 and Equation 2,

First, if f=0 (f denotes a factor determining a fairness value), a mobile station having higher signal reception power level feeds back channel quality indicator more frequently than a mobile station having lower signal reception power level.

Second, if f=1, all mobile stations impartially feeds back channel quality indicator on average.

Third, if f>1, as f increases, a mobile station having lower signal reception power level feeds back channel quality indicator more frequently than a mobile station having higher signal reception power level.

In the first case where f=0, as conventional, a mobile station having higher signal reception power level feeds back channel quality indicator more frequently than a mobile station having lower signal reception power level.

Referring to FIG. 2, description will be made on a method for determining a feedback period of channel quality indicator in accordance with an embodiment of the present invention as stated above.

First, a mobile station receives and stores in a memory factors determining a fairness value used for each mobile station and various variables such as a threshold value assigned to each mobile station according to whether priority exists, from a base station through a control channel at step S201. Furthermore, the mobile station can receive wireless resources information for feeding back channel quality indicator from the base station through the control channel. When a feedback channel is fixed to each mobile station, the mobile station may not receive the wireless resources information for feedback.

Next, the mobile station estimates a channel gain by using a pilot signal received from the base station at step S202. Further, the mobile station implements a statistical expectation value algorithm over the estimated channel gain, estimates a weight in Equation 1 based on a received factor for determining a fairness value, and estimates a weight channel quality by multiplying the estimated weight value and channel gain at step S203.

Furthermore, the CQI transmission determination unit of the mobile station compares a received threshold value to the estimated weight channel quality, and, when the estimated weight channel quality is higher than the threshold value, feeds the estimated channel quality indicator back to the base station by using the feedback wireless resources assigned for the feedback of channel quality indicator at step S205.

Figure 5:
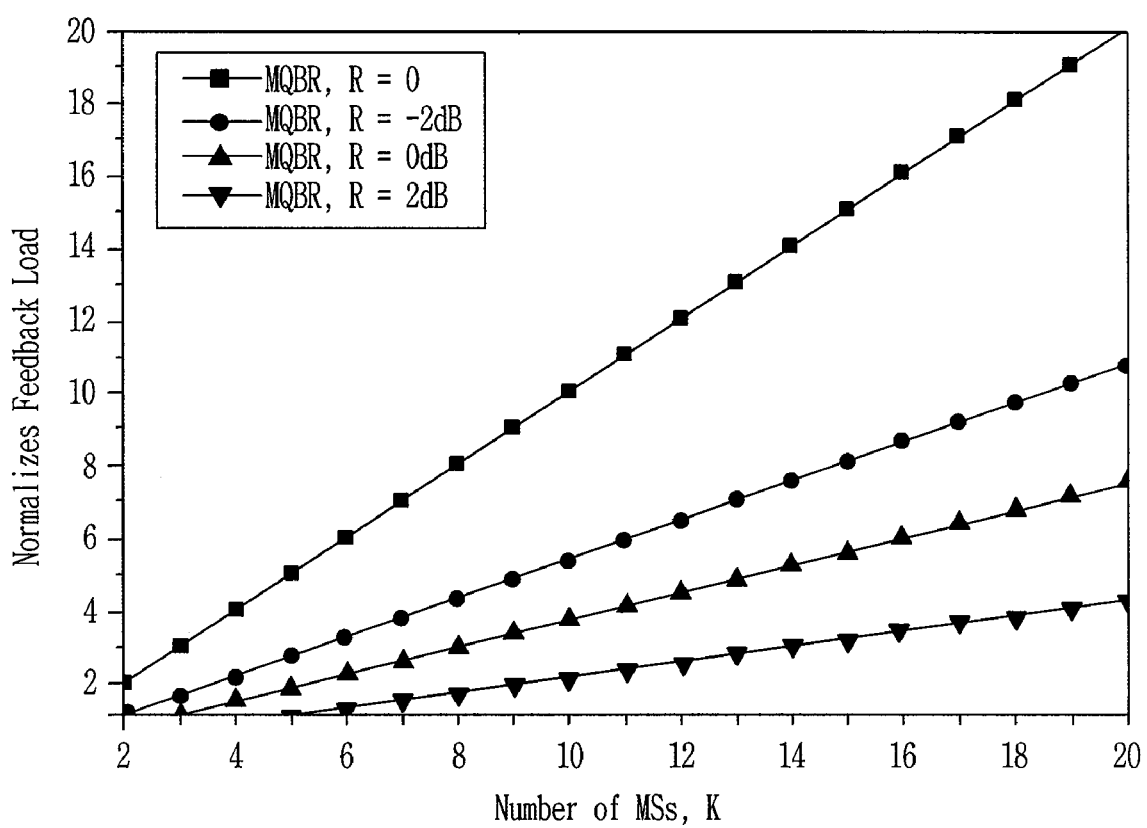
FIG. 5 is a view for showing feedback channel load according to the number of mobile stations in accordance with an embodiment of the present invention.
Figure 6:
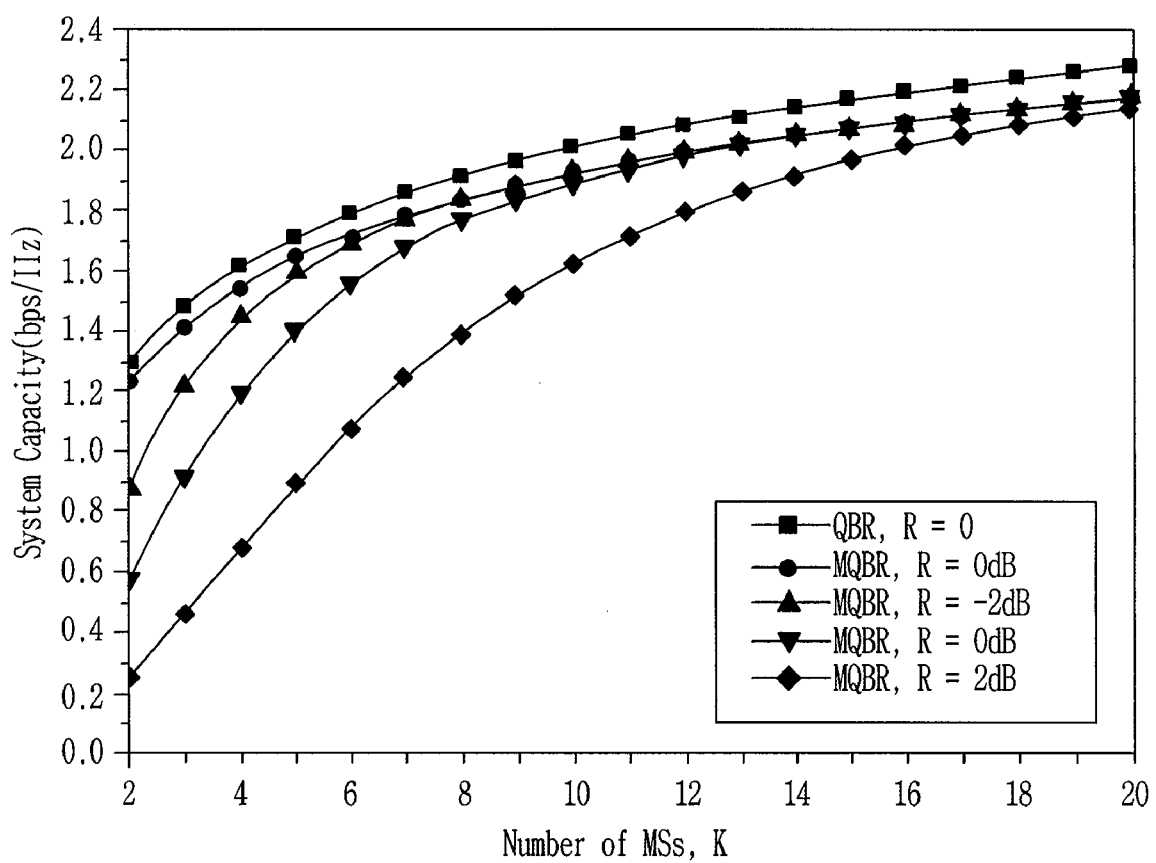
FIG. 6 is a view for showing system capacity according to the number of mobile stations when the present invention is used.
Figure 7:
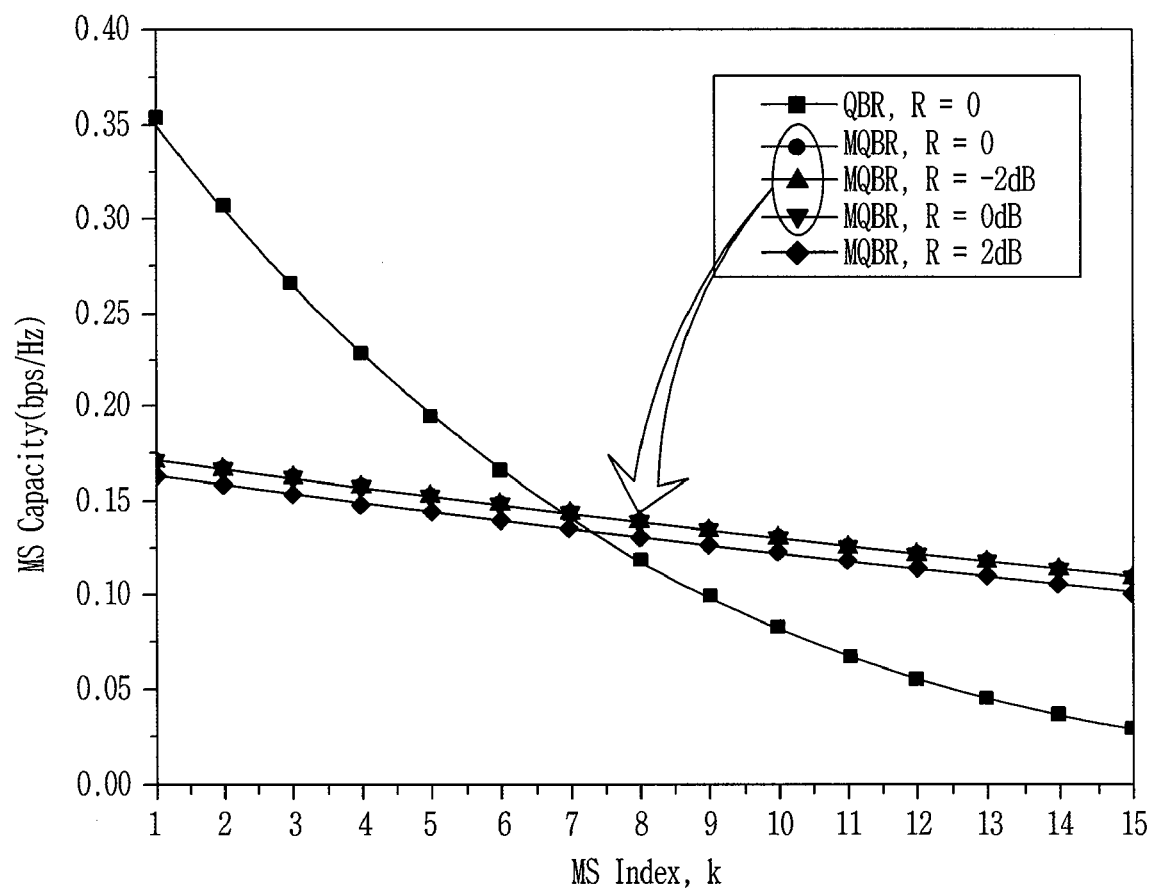
FIG. 7 is a view for showing capacity of individual mobile stations when the number of the mobile stations is 15 in accordance with an embodiment of the present invention.

FIGS. 5 to 7 are views for showing feedback channel loads, system capacities, and mobile station capacities when f=1 and $R_1=R_2=L=R_k=R$ in accordance with a method for determining a feedback period of channel quality indicator suggested as an embodiment of the present invention (in the figures, the present invention is referred to as 'MQBR').

R=0 means that all mobile stations feed back channel quality indicator. Further, a base station is fed back with weight channel quality and selects one mobile station for resources assignment by using greedy scheduling. It is assumed that the channel of each mobile station is an independent Rayleigh fading channel.

Figure 4:
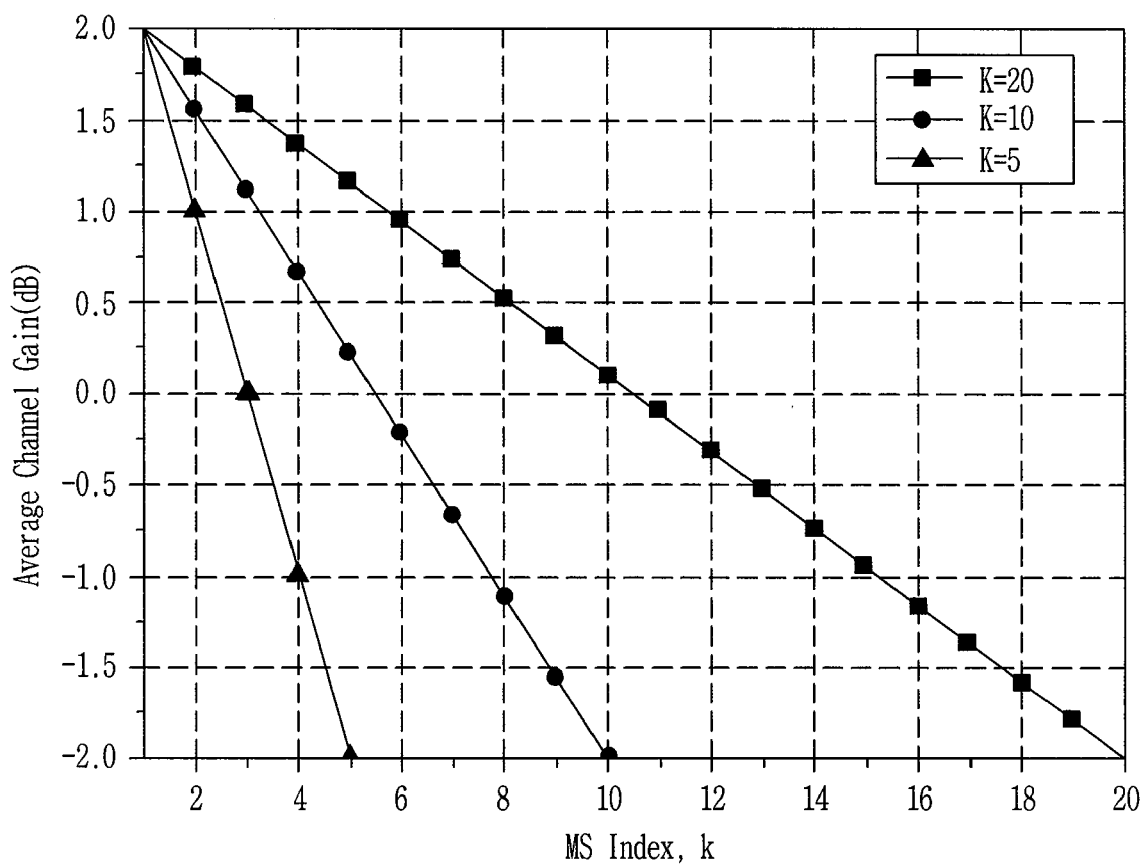
FIG. 4 is a view for showing average signal-to-noise ratios for individual mobile stations, when the number of the mobile stations is 5, 10, and 20.

FIG. 4 is a view for showing a signal reception power level distribution of a mobile station, showing average signal-to-noise ratios that individual mobile stations have when the number of the mobile stations is 5, 10, and 20.

FIG. 5 is a view for showing feedback channel loads as the number of mobile stations increases, which is obtained under the assumption that one mobile station uses one feedback channel. In FIG. 5, it can be seen that a feedback channel load remarkably decreases as a threshold value R increases.

FIG. 6 is a view for showing system capacities according to the number of mobile stations. As a threshold value increases, system capacity decreases over a small number of mobile stations but the system capacity hardly decreases over a large number of mobile stations. Compared to a conventional method (in the figure, referred to as QBR), it can be seen that the present invention obtains a less system capacity than conventional technologies. However, as shown in FIG. 7, with respect to the capacity of each mobile station when the number of mobile stations is 15, it can be seen that the present invention considerably mitigates a severe fairness problem caused by conventional methods.

Figure 3:
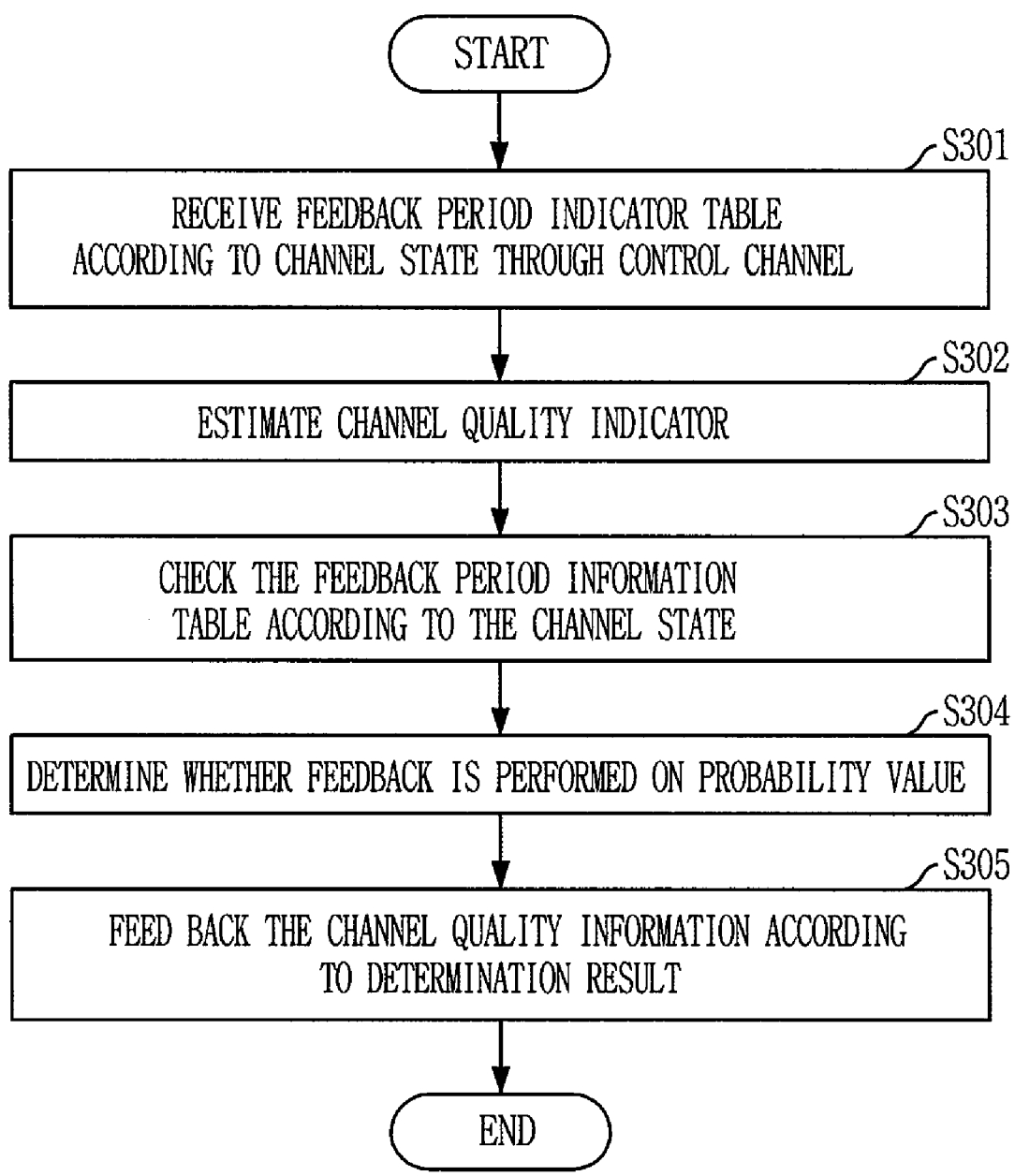
FIG. 3 is a flowchart of determining a feedback period of channel quality indicator for the mobile station in accordance with another embodiment of the present invention.

FIG. 3 is a flowchart describing a method for determining a feedback period for feedback of channel quality indicator in accordance with a second embodiment of the present invention.

In the second embodiment of the present invention, a feedback period of channel quality indicator is differently determined according to a channel state.

First, a mobile station receives and stores in a table of the memory feedback period information according to a channel state from a base station through a control channel at step S301. In other words, the base station differently determines and stores a feedback period for feedback of channel state information according to a channel state level having a predetermined range through tests or simulations, and transmits the feedback period according to the channel state through the control channel to the mobile station.

Next, the mobile station estimates channel quality indicator by using a pilot signal received from the base station at step S302, and checks feedback period information from the table stored in the memory according to the estimated channel quality indicator at step S303. Furthermore, the mobile station feeds back through a feedback channel to the base station the estimated channel quality indicator according to the checked feedback period at step S305. In other words, a mobile station of good channel state is allowed to frequently feed back by shortening a feedback time period of channel quality indicator, and a mobile station of poor channel state lengthens the feedback time period of channel quality indicator.

At the same time, a mobile station can determine a feedback period by using a probability value if necessary at step S304. That is, a mobile station can feed back channel quality indicator necessarily every feedback period of channel quality indicator, while it can determine whether to feed back channel quality indicator by using a predetermined probability value p in its feedback period of channel quality indicator. The probability value p means that a feedback probability of channel quality indicator is p and a non-feedback probability is (1−p).

Meanwhile, the second embodiment of the present invention has been described such that it stores a feedback period into a mobile station according to a channel state, but a base station can notify a mobile station of a feedback period based on channel quality indicator fed back from each mobile station.

The third embodiment of the present invention differently determines a feedback period of channel quality indicator according to a moving velocity of a mobile station.

First, a mobile station receives and stores in a table of the memory feedback period information according to its own moving velocity through a control channel from a base station. In other words, the base station differently determines and stores a feedback period for feedbacks of channel quality indicator according to a moving velocity level of a mobile station, wherein the moving velocity level has a predetermined range, and transmits to the mobile station the feedback period according to the moving velocity of the mobile station through the control channel.

Next, the mobile station measures its own moving velocity based on position information measured by a GPS receiver which is a global positioning system, and checks from a table stored in the memory a feedback period according to the measured moving velocity of the mobile station. Further, the mobile station feeds back estimated channel quality indicator to the base station through a feedback channel by using a pilot signal received from the base station according to the checked feedback period. In other words, if the mobile station moves fast, the feedback period of channel quality indicator is shortened for frequent feedbacks, and if the mobile station moves slow, the feedback period of channel quality indicator is lengthened.

At the time, the mobile station can determine a feedback period by using a probability value if necessary. That is, it is possible for the mobile station to feed back channel quality indicator necessarily every feedback period of channel quality indicator, but it is also possible for the mobile station to determine whether to feed back channel quality indicator by using a predetermined probability value p at a feedback period of channel quality indicator of its own.

The fourth embodiment of the present invention is to determine a feedback period of channel quality indicator under consideration of a channel state and moving velocity of a mobile station as described above.

First, a mobile station receives and stores in a table of the memory feedback period information according to a combination of its moving velocity and channel state through a control channel from a base station. For example, the table includes a feedback period of channel state information in case that a moving velocity of a mobile station belongs to a predetermined range and a channel state belongs to a predetermined range.

Next, the mobile station estimates channel quality indicator by using a pilot signal received from the base station, and measures its moving velocity based on position information estimated by a GPS receiver. Furthermore, the mobile station checks, from the table stored in the memory, the feedback period information according to its measured moving velocity and channel quality indicator. Furthermore, the mobile station feeds back the estimated channel quality indicator through a feedback channel to the base station by using the pilot signal received from the base station.

At the time, the mobile station can determine a feedback period by using a probability value if necessary. That is, the mobile station can feed back channel quality indicator necessarily every time feedback period of channel quality indicator, but can determine whether to feed back channel quality indicator by using a predetermined probability value p at its own feedback period of channel quality indicator.

As described above, the technology of the present invention can be realized as a program. A code and a code segment forming the program can be easily inferred from a computer programmer of the related field. Also, the realized program is stored in a computer-readable recording medium, i.e., information storing media, and is read and operated by the computer, thereby realizing the method of the present invention. The recording medium includes all types of recording media which can be read by the computer.

While the present invention has been described with respect to certain preferred embodiments, it will be apparent to those skilled in the art that various changes and modifications may be made without departing from the scope of the invention as defined in the following claims.

What is claimed is:

1. A method for determining a feedback period for providing channel quality indicator in a mobile station for a wireless communication system, comprising the steps of:
    a) estimating a channel gain based on a signal received from a base station;
    b) calculating a weight value by using a variable for determining a fairness value and the estimated channel gain, and estimating weighted channel quality to the channel gain based on the calculated weight value;
    c) comparing the weighted channel quality and a threshold value; and
    d) feeding back estimated channel quality indicator by using wireless resources assigned for the channel quality indicator feedback when the weighted channel quality is higher than the threshold value.

2. The method of claim 1, further comprising the step of:
    receiving the fairness determination variable and the threshold value from the base station through a control channel.

3. The method of claim 2, wherein the weighted channel quality is estimated by performing a statistical expectation algorithm over the channel gain, calculating the weight value based on a result of the statistical expectation algorithm and the fairness determination variable, and multiplying the weight and the channel gain.

4. The method of claim 2, wherein the threshold value is an adjustable value for every mobile station depending on priority.

5. An apparatus for determining a feedback period of channel quality indicator in a mobile station for a wireless communication system, comprising:
    a memory for storing a fairness determination variable and a threshold value;
    a channel gain estimation unit for estimating a channel gain from a signal transmitted from a base station;
    a weight channel quality estimation unit for calculating a weight value by using the stored fairness determination variable and the estimated channel gain, and estimating weighted channel quality to the estimated channel gain based on the calculated weight value; and
    a comparison unit for comparing the estimated weighted channel quality to the stored threshold value and determining feedback of estimated channel quality indicator when the weighted channel quality is higher than the threshold value.

6. The apparatus of claim 5, wherein the fairness value determination variable and the threshold value stored in the memory are received from the base station through a control channel.

7. The apparatus of claim 5, wherein the weight channel quality estimation unit performs a statistical expectation algorithm over the channel gain, calculates the weight by using a result of the statistical expectation algorithm and the fairness determination variable, and estimates the weighted channel quality by multiplying the weight value and the channel gain.

8. The apparatus of claim 5, wherein the threshold value is an adjustable value for every mobile station depending on priority.

9. A method for determining a feedback period for providing channel quality indicator in a mobile station for a wireless communication system, comprising the steps of:
    a) estimating a channel gain based on a signal received from a base station;
    a-1) calculating a weight value by using a variable for determining a fairness value and the estimated channel gain;
    b) checking from a table the feedback period of channel quality indicator according to the weight value; and
    c) feeding back the channel quality indicator by using wireless resources assigned for the feedback of channel quality indicator according to the checked feedback period of channel quality indicator, where the better a channel state checked from the estimated channel gain, the shorter the feedback period of channel quality indicator is set.

10. The method of claim 9, further comprising the step of: stochastically estimating whether to feed back the channel quality indicator by using a probability value received from the base station after the step b).

11. The method of claim 10, further comprising the step of: receiving the feedback period of channel quality indicator to the channel gain and the probability value through a control channel from the base station.

12. The method for determining a feedback period for providing channel quality indicator in a mobile station for a wireless communication system, comprising steps of:
 a) estimating a moving velocity of a mobile station;
 a-1) calculating a weight value by using a variable for determining a fairness value;
 b) checking from a table the feedback period of channel quality indicator according to the estimated moving velocity of the mobile station and the weight value; and
 c) feeding back the channel quality indicator by using wireless resources assigned for the feedback of channel quality indicator according to the checked feedback period of channel quality indicator,
 where the faster the estimated moving velocity of the mobile station, the shorter the feedback period of channel quality indicator is set.

13. The method of claim 12, further comprising the step of: stochastically estimating whether or not the channel quality indicator is fed back by using a probability value received from a base station after the step b).

14. The method of claim 13, further comprising the step of: receiving the feedback period of channel quality indicator according to the moving velocity of the mobile station and the probability value through a control channel from the base station.

15. A method for determining a feedback period of channel quality indicator in a mobile station for a wireless communication system, comprising steps of:
 a) estimating a channel gain based on a signal received from a base station;
 a-1) calculating a weight value by using a variable for determining a fairness value and the estimated channel gain;
 b) measuring a moving velocity of a mobile station;
 c) checking the feedback period of channel quality indicator according to a combination of the the weight value and the moving velocity of the mobile station; and
 d) feeding back estimated channel quality indicator by using wireless resources assigned for the feedback of channel quality indicator according to the checked feedback period of channel quality indicator.

16. The method of claim 15, further comprising the step of: stochastically estimating whether or not the channel quality indicator is fed back by using a probability value received from the base station after the step c).

17. The method of claim 16, further comprising the step of: receiving the feedback period of channel quality indicator and the probability value according to a combination of the channel gain and the moving velocity of the mobile station through a control channel from the base station.

* * * * *